May 18, 1937. K. R. CHARLTON 2,080,909
DEVICE FOR MEASURING AND RECORDING WHEEL ALIGNMENT
Filed Nov. 22, 1932
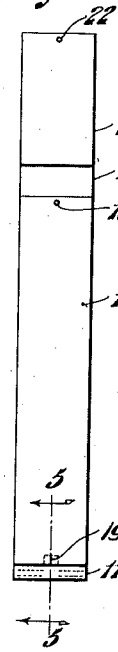
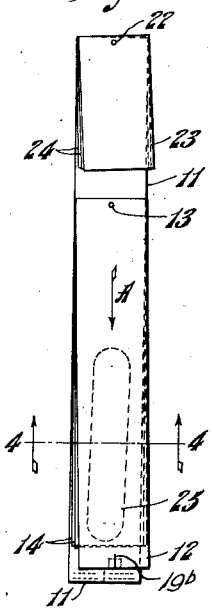
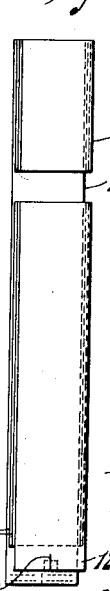
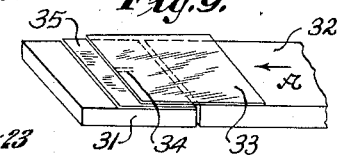
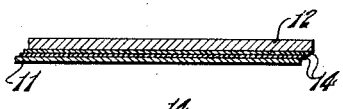
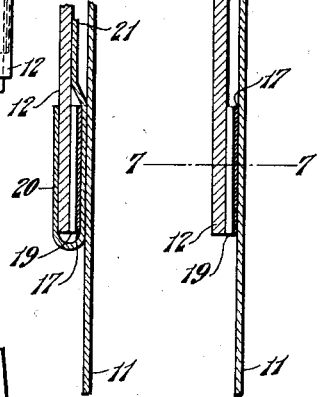
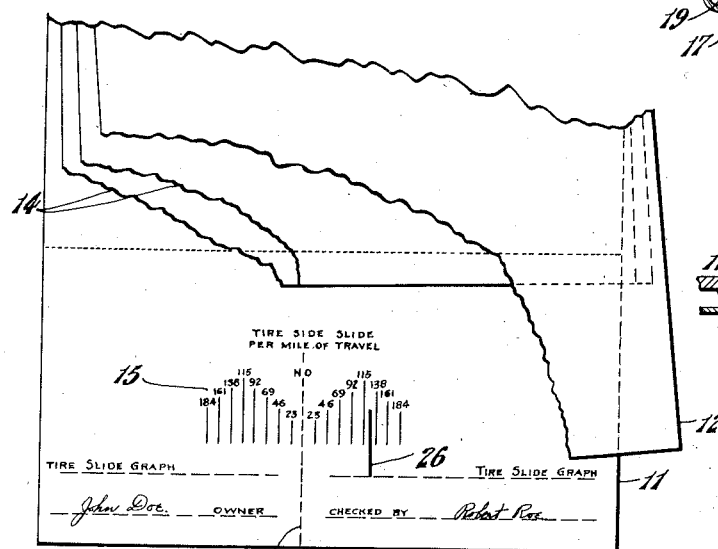
INVENTOR,
Kenneth R. Charlton,
BY
Frank E. Haskell
ATTORNEY.

Patented May 18, 1937

2,080,909

UNITED STATES PATENT OFFICE 2,080,909

DEVICE FOR MEASURING AND RECORDING WHEEL ALIGNMENT

Kenneth R. Charlton, Holyoke, Mass.

Application November 22, 1932, Serial No. 643,874

10 Claims. (Cl. 33—203)

This invention relates to devices for determining the accuracy of the alignment of the wheels of an automobile or similar vehicle. The front wheels especially, being operated by means of complicated steering mechanism, need frequent checking and occasional readjustment. It has become standard practice in automobile construction to set the front wheels so that they are closer together at the bottom than at the top. This is called camber and results in much easier steering. Furthermore, measurements made in a horizontal plane passing through the center of the wheels should show the wheels nearer together at the front than at the rear. This is called toe-in and the exact value of this toe-in varies with the design of the car. The usual practice in case readjustment is required is to make such readjustment to the value for toe-in given by the manufacturer of that particular car. When these adjustments have been correctly made the wheels will roll freely, in the direction in which the car is moving, with a minimum amount of wear on the tires. In case the wheels are not correctly adjusted there is a tendency for them to roll in a direction slightly different from that in which the car is traveling. Because the car is nevertheless constrained to move in a forward direction there is a continuous slipping of the tire sidewise on the road and a very much more rapid wearing away of the tire.

It is one of the objects of the present invention to determine the amount of this side slip of the tire. The amount of this side slip then serves as a guide in making a readjustment of the wheels and a second measurement is made and further readjustment until the final measurement for side slip shows that there is none and that no further readjustment is required. It is clear that the direct measurement of side slip obviates the necessity of knowing what the adjustment for toe-in should be for any particular design of car. Furthermore, there are various changes that may take place in the parts of a car, due to accidents or otherwise, which will make the value of toe-in given by the manufacturer incorrect. With the present invention the wheels are adjusted for zero side slip and minimum wear regardless of any slight bending of the axles or other parts that may have taken place.

It is a further object of the invention to automatically record the amount of side slip. The permanent record obtained in this manner may be used for comparison with other records made at different stages of readjustment.

It is another object of the invention to provide means for measuring and recording the amount of side slip which shall be inexpensive to make and simple to operate.

It is a still further object of the invention to eliminate all stresses in the rubber of the tire in a lateral direction such as compression and distortion so that the indications may be solely of the side slip during the test and not an indication of stresses set up prior to the test proper.

While the foregoing discussion has referred specifically to the front wheels of an automobile it is to be understood that the rear wheels may also be tested for alignment with the device disclosed as well as any similar type of wheel.

In order to more clearly set forth the invention the following description is given of one embodiment thereof taken in connection with the accompanying drawing in which Fig. 1 is a plan view of the device;

Fig. 2 is a plan view of the device showing how the parts have moved after a wheel which is out of alignment has passed over them;

Fig. 3 is a view similar to Fig. 2 of a modified form of the device;

Fig. 4 is a section taken on the line 4—4 of Fig. 2;

Fig. 5 is a section taken on the line 5—5 of Fig. 1;

Fig. 6 is a section similar to Fig. 5 but also showing the protective means employed during shipment and transportation;

Fig. 7 is a section taken on the line 7—7 of Fig. 5;

Fig. 8 is a greatly enlarged plan view of the lower part of Fig. 2, partly broken away; and Fig. 9 is a fragmentary perspective view illustrating certain recording features of the invention applied to a portion of a tire side slip testing device of a similar character in which the movable and stationary members are rugged enough to support an automobile without being supported throughout their entire surfaces.

Referring to the drawing more in detail the reference character 11 represents a sheet of paper or other material, but preferably of paper of average weight and thickness, which is positioned on the floor of a garage or other place where the test of the wheel alignment is to be made. By average thickness is meant paper approximately three-thousandths of an inch thick. While paper would still have an "average thickness"

even though it varied somewhat from this figure yet a thickness of one-thousandth of an inch would be much thinner than average thickness and more like tissue paper and on the other hand paper having a thickness of five-thousandths of an inch would be much thicker than "average" and approaching the thickness of card index material. A second sheet of paper 12 which is preferably of much heavier stock such as Bristol board is positioned above the sheet 11. It has been found that if the upper sheet 12 is of thin or light weight paper the irregularities of the tire passing over it, particularly a new tire, is very apt to crinkle it badly. One end of the sheet 12 is pivoted to the sheet 11 as at 13. As shown in the drawing the lower sheet 11 extends some distance beyond the sheet 12 but as will be hereinafter explained the lower sheet 11 may in a simple form of construction terminate with the sheet 12 and not extend beyond it at this end. At the other end of the sheet 12 the sheet 11 may be either of the same length or, preferably, the sheet 11 may extend slightly beyond the sheet 12 and it is so shown in the drawing.

The reason for having the sheet 11 extend beyond the sheet 12 is so that the lower sheet as well as the upper sheet will be visible when the device is being set up for a test and so that the operator can thereby more readily place the two sheets in the proper initial position relative to each other. This is one way and a simple way of rendering both the lower sheet and the upper sheet simultaneously visible in order to facilitate the initial setting or adjustment of the device.

There are also preferably provided one or more sheets of paper 14 positioned between the sheets 11 and 12 and pivoted therewith at the pivot 13. These sheets may be of waxed paper or of such a character as to readily slip and slide on each other. In lieu of the intermediate sheets 14 the surfaces of the sheets 11 and 12 which are in contact with each other may be treated in such a way as to have a minimum amount of friction against slipping.

The precise way in which two sheets of paper slip relative to each other seems to have some relation to the air which is allowed to enter between the sheets. It is therefore not only desirable but almost essential that the sheets be separated in order to allow the air to enter freely between the sheets before the test is made. By means of this precaution sheets which would not be expected to slip readily will operate much better than sheets specially treated which have not been thus prepared by admitting air and in all cases the operation is much improved.

The sheet 11 may be provided with a suitable scale 15 upon which the result of the test may be marked. A line 16 preferably positioned at the middle of the sheet 11 is used for a reference line and the amount of side slip is indicated by distances at each side of the reference line 16. Means may be provided for automatically marking the scale 15, one suitable arrangement being shown in Fig. 7. A piece of carbon paper 17 is fastened to the under side of the upper sheet 12 by means of gummed strips of paper 18. A suitable member 19, or marker, is held between the carbon paper 17 and the sheet 12. As shown in the drawing this member is in the form of a piece of wire or small rod. For convenience in observing whether the rod 19 is positioned precisely over the reference line 16 a reference mark 19b may be provided on the upper side of the sheet 12. When this reference mark 19b is in line with the reference line 16 extended, see Fig. 8, the device is in the proper position for making a test. The relative position of the upper reference mark 19b and the extension of the reference line 16 also enables the operator to observe the amount of side slip prior to the lifting up of the sheet 12 to see the recorded mark or even before the wheel has passed over the rod to make the record. In order to prevent the carbon paper 17 from marking or smudging the sheet 11 during transportation and prior to the test a protective sheet of thin paper 20 may be glued to the sheet 12 at 21 as shown in Fig. 6 and then folded around this portion of the device.

As shown in Figs. 1 and 2 the sheet 11 extends some distance beyond the end of the sheet 12 and at the end of the sheet 11 there may be provided a pivot 22. A sheet of heavy paper or Bristol board 23 similar to the sheet 12 may be pivoted at one end at 22 and may extend at the other end nearly to the sheet 12. There may also be positioned between the sheet 11 and the sheet 12 and pivoted at 22, intermediate sheets 24 of waxed paper similar to the sheets 14. This sheet 23, as will be more fully explained in discussing the operation of the device, is for the purpose of removing initial stresses in the tire before the actual measurement is made.

In the modification shown in Fig. 3 the pivots 13 and 22 are omitted and the upper sheets 12 and 23 move in a purely lateral direction instead of in a rotary direction around the pivots 13 and 22 respectively.

In operation the device is placed flat on the floor with the end where the pivot is, positioned directly in front of the wheel to be tested. The protective strip 20 is then torn off and the rod 19 with its carbon paper positioned directly above the reference line 16. The wheel of an automobile is then rolled, in the direction indicated by the arrow A, over the end where the pivots 22 and 13 are positioned and toward the end where the marking rod 19 is positioned. Fig. 2 shows a wheel 25 in dotted lines having nearly traversed the length of the sheet 12 and about to pass over the rod 19 and the carbon paper 17. In passing over the rod 19 the weight of the car presses the wheel 25 against the rod 19 and the carbon paper 17 and marks a line on the sheet 11 as indicated at 26 in Fig. 8. As the wheel passes from the end where the pivot 13 is positioned, the upper sheet with its marker moves laterally so that the marker passes from above the position 16 to the position indicated at 26 but because of the very little pressure existing between the sheets until the automobile is directly over the marker there is no marking of the lower sheet. It will be noted that not only is there an indication of the side slip but that a printed record is made thereof. By thus providing a means for recording the amount of side slip many of the errors are eliminated which are due to the transient indications of an ordinary indicating device. It will be noted that the wheel in Fig. 2 is shown out of alignment so that its tendency is to roll toward the left of the drawing (as viewed by the reader) and because the car is moving in a straight line and does not permit the wheel to move toward the left the wheel pushes the sheet of paper 12 toward the right and there is no slipping between the tire and the sheet of paper 12. The amount of this side pushing of the paper 12 is indicated by the distance of the mark 26 from the reference line 16. The measurement of this side slip is therefore a direct measurement of the side movement or slipping of the tire on the ground when in use and indicates the amount of wear to be expected. If desired the scale 15 may be calibrated in terms of the number of feet that a tire would move sideways while the car was traveling a mile.

While there are other terms in which the scale may be calibrated the number of feet per mile is a term that is readily understood by anyone and gives a vivid idea of the frictional wear to which the tire is being subjected in actual use. Such a calibration can be most accurately effected by using a car which has a wheel out of alignment an amount that is definitely known. A preliminary calculation can also be made by means of trigonometric ratios but the actual checking with a wheel out of alignment a known amount is probably the most accurate.

This feature of automatically making a printed record of the amount of side slip is deemed to be of considerable importance and may obviously be employed in various devices of a more expensive and rigid character than the device shown herein. Such a device is shown in the patent to Bennett, No. 1,878,664 and in Fig. 9 hereof is shown more or less diagrammatically the application thereto of the recording features of the present invention. The reference character 31 indicates a portion, such as a board, of the device which is stationary and the reference character 32 a laterally movable board. Attached to one end of the member 32 is a piece of paper 33 which extends beyond the end of the member 32 and carries a marker 34 similar to the marker 19. The stationary member 31 has positioned on its upper surface, preferably being secured thereto in some readily detachable manner, a piece of paper 35 which may carry a scale, not shown, such as the scale 15. As the wheel of an automobile traverses the member 32 in the direction indicated by the arrow A and passes over the marker 34 it will press it against the paper 35 and make a record thereon of the side slip, similar to the manner already described for the previous figures.

Because there is considerable friction between the tire and the ground the rubber is ordinarily under more or less stress whenever there is side slip. When this stress becomes great enough it overcomes the friction, causes some side slip and partially relieves the stress. The first result, in such a case, of the wheel moving onto the device would be for the tire to push the sheet sideways to relieve the rubber of the stresses to which it was subjected and to therefore give an indication independent of the slip due to the movement of the tire along the sheet of paper which the device is designed to measure and consequently to cause an incorrect reading. By providing the short piece of material 23 the rubber tire pushes this piece sideways and relieves itself of stresses so that it passes onto the sheet 12 of the measuring device proper without any initial stresses to cause erroneous indications. It will be understood that the main purpose of the device is to indicate that the wheel is out of alignment and to readjust it until there is indicated no side slip at all and for this reason it may be that exact readings of the amount of side slip will not be considered necessary and so the sheet 23 may be dispensed with.

One of the important advantages of the invention is the extremely small thickness of the whole device from the floor or ground upon which it is placed to the top of the sheet 12. The wheel 25 in rolling over the device will therefore be at almost exactly the same height or level as the other wheel or wheels. There have been devices suggested heretofore which either extend an appreciable distance above the floor and thereby introduce a certain amount of error or require to be set into the floor with the consequent extra expense. The present device is unique in that it neither introduces any appreciable error nor requires special provision to avoid such error.

While the foregoing description of the operation of the device assumes that the car is moving in a straight line, it should be emphasized that the use of the invention is not necessarily confined to such movement. It is also important that the forward wheels of an automobile be so adjusted that the wheels will be free from side slip when the car is moving around a curve. The present device is capable of indicating whether there is any such side slip with the same high degree of accuracy and with the same simplicity of operation as in the case of a movement of the car in a straight line.

I claim:

1. A device for measuring and recording wheel alignment comprising a sheet of paper, a second sheet of paper superimposed on said first-named sheet of paper and movable with respect to said first-named sheet of paper a distance proportional to the side slip of a wheel rolling thereover, and means attached to one of said sheets and adapted to mark the other of said sheets when a wheel passes over said marking means.

2. A device for measuring and recording wheel alignment comprising a sheet of paper, a second sheet of paper superimposed on said first-named sheet of paper and movable with respect to said first-named sheet of paper a distance proportional to the side slip of a wheel rolling thereover, a carbon paper attached to one of said sheets with its marking surface facing the other sheet, and a rod positioned between said carbon paper and the sheet to which it is attached whereby said rod presses the carbon paper against the other sheet to record a mark thereon when said wheel rolls over said rod.

3. In a device for measuring wheel alignment, a thin elongated member, the thickness of which is so small that the strength of the member is insufficient to support the weight of an automobile, positioned on the floor of a garage so that its entire surface is in contact with the floor of the garage and supported thereby, and a second thin elongated member of insufficient strength to support the weight of an automobile positioned on said first-named member and having its entire lower surface in contact with the upper surface of said first-named member, the adjacent surfaces of said members being slidable with respect to each other and having means associated therewith for reducing friction, and means for measuring the distance the second member slides with respect to said first-named member.

4. In a device for measuring and recording wheel alignment, a thin elongated member, the thickness of which is so small that the strength of the member is insufficient to support the weight of an automobile, positioned on the floor of a garage so that its entire surface is in contact with the floor of the garage and supported thereby, and a second thin elongated member of insufficient strength to support the weight of an automobile positioned on said first-named member and having substantially its entire lower surface in contact with the upper surface of said first-named member, the adjacent surfaces of said members being slidable with respect to each other and having means associated therewith for reducing friction, one end of said second-named thin member being pressable against said first-named member, and means carried by said second-named member for producing a record on said first-named member when an automobile passes over said means and presses it against said first-named member.

5. A device for measuring and recording the wheel alignment of an automobile wheel rolling over the floor of a garage in normal operation comprising a member having a flat under surface for resting on the floor of a garage and a flat smooth upper surface, a second member having a flat smooth under surface superimposed on said first-named member and slidable sideways thereover whereby the passage of a wheel out of alignment as it rolls over said members in normal operation will cause the second-named member to move sideways with respect to said first-named member, and means operated by the passage of the wheel thereover for recording directly the amount of side slip between said members.

6. A device for measuring and recording the wheel alignment of an automobile wheel rolling over the floor of a garage in normal operation comprising a member having a flat under surface for resting on the floor of a garage and having a flat smooth upper surface, a second member having a flat smooth under surface superimposed on said first-named member and slidable sideways thereover whereby the passage of a wheel out of alignment as it rolls over said members in normal operation will cause the second-named member to move sideways with respect to said first-named member, and means attached to one of said members for recording on the other of said members the amount of side slip between said members.

7. In a device for measuring the wheel alignment of an automobile wheel rolling over the floor of a garage in normal operation, a sheet of paper positioned on the floor of the garage, a second sheet of paper superimposed on said first-named sheet of paper and slidable sideways thereover whereby the passage of a wheel out of alignment as it rolls over said sheets in normal operation will cause the second-named sheet of paper to move sideways with respect to said first-named sheet of paper, means between said sheets of paper for reducing friction therebetween, and means for indicating the relative movement between said sheets caused by the passage of the wheel thereover.

8. In a device for measuring the wheel alignment of an automobile wheel rolling over the floor of a garage in normal operation, a sheet of paper positioned on the floor of the garage, a second sheet of paper superimposed on said first-named sheet of paper and slidable sideways thereover whereby the passage of a wheel out of alignment as it rolls over said sheets in normal operation will cause the second-named sheet of paper to move sideways with respect to said first-named sheet of paper, a sheet of waxed paper positioned between said sheets of paper, and means for indicating the relative movement between said sheets caused by the passage of the wheel thereover.

9. A device for measuring the wheel alignment of an automobile wheel rolling over the floor of a garage in normal operation comprising a sheet of paper positioned on the floor of a garage, a second sheet of paper superimposed on said first-named sheet of paper and pivoted thereto at one end thereof and slidable sideways thereover whereby the passage of a wheel out of alignment as it rolls over said sheets in normal operation will cause the second-named sheet of paper to move sideways with respect to said first-named sheet of paper, and means at the opposite end of said sheets from said pivoting for indicating the amount of side slip therebetween.

10. A device for measuring and recording the wheel alignment of an automobile wheel rolling over the floor of a garage in normal operation comprising a member having a flat under surface for resting on the floor of the garage and having a flat smooth upper surface, a second member having a flat smooth under surface superimposed on said first-named member and slidable sideways thereover whereby the passage of a wheel out of alignment as it rolls in normal operation over said members will cause the second-named member to move sideways with respect to said first-named member, a portion of said second-named member being pressable vertically toward said first-named member, and means attached to one of said members for recording on the other of said members when pressed thereagainst by the passage of a wheel thereover the amount of side slip between said members caused by the wheel passing thereover.

KENNETH R. CHARLTON.